Jan. 20, 1959
H. D. LUX
2,869,649
HELICOPTER ROTOR
Filed April 7, 1953
6 Sheets—Sheet 1
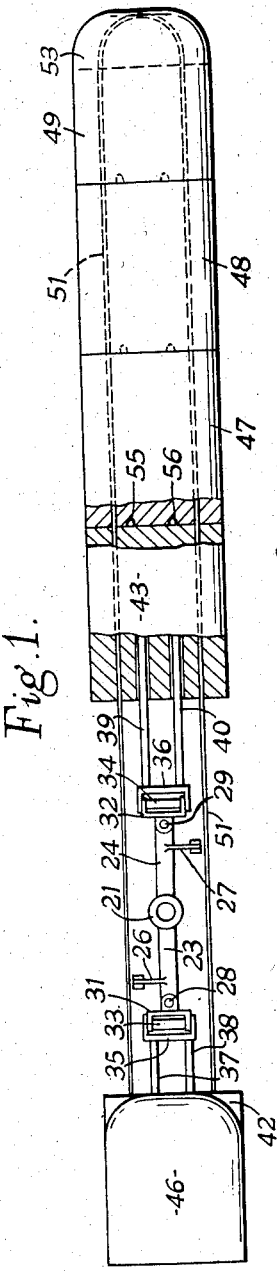
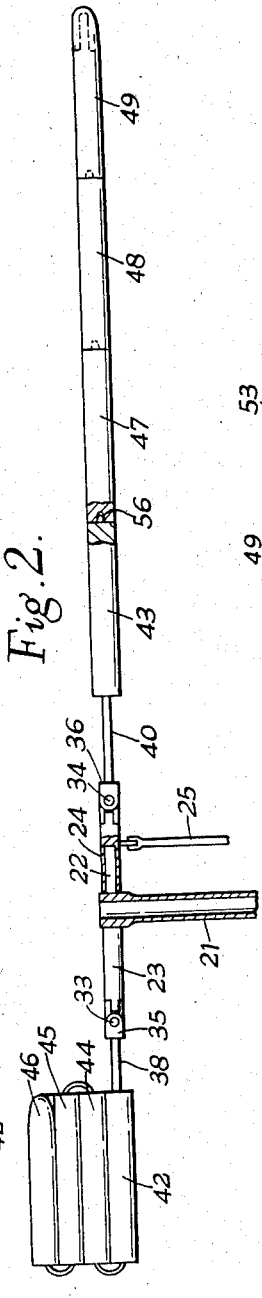
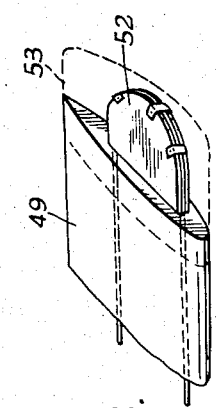
INVENTOR
HORST DIETER LUX
BY
ATTORNEY Jan. 20, 1959  H. D. LUX  2,869,649
HELICOPTER ROTOR Filed April 7, 1953  6 Sheets-Sheet 2

INVENTOR
HORST DIETER LUX
BY
*Klein & Hart*
ATTORNEY

Jan. 20, 1959  H. D. LUX  2,869,649
HELICOPTER ROTOR
Filed April 7, 1953  6 Sheets-Sheet 3
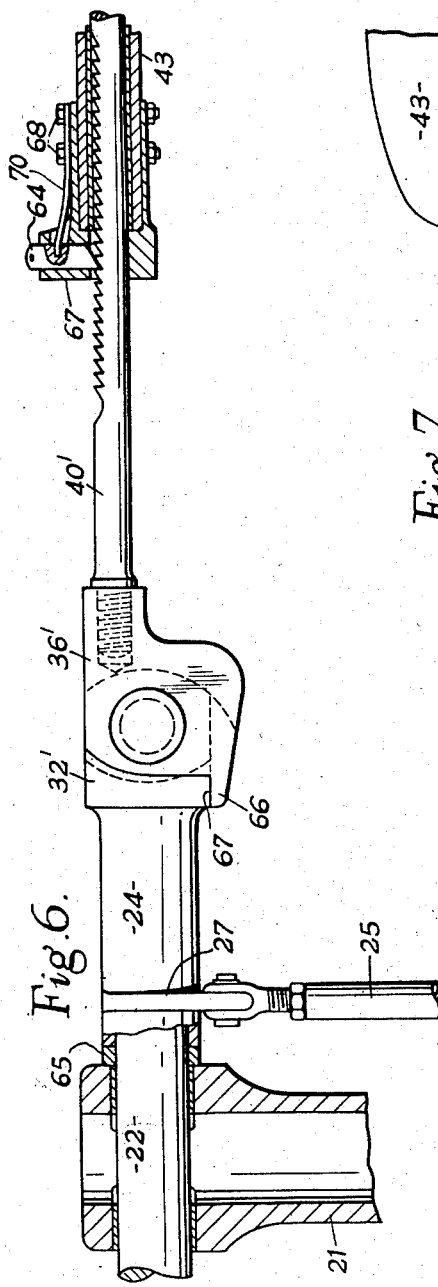
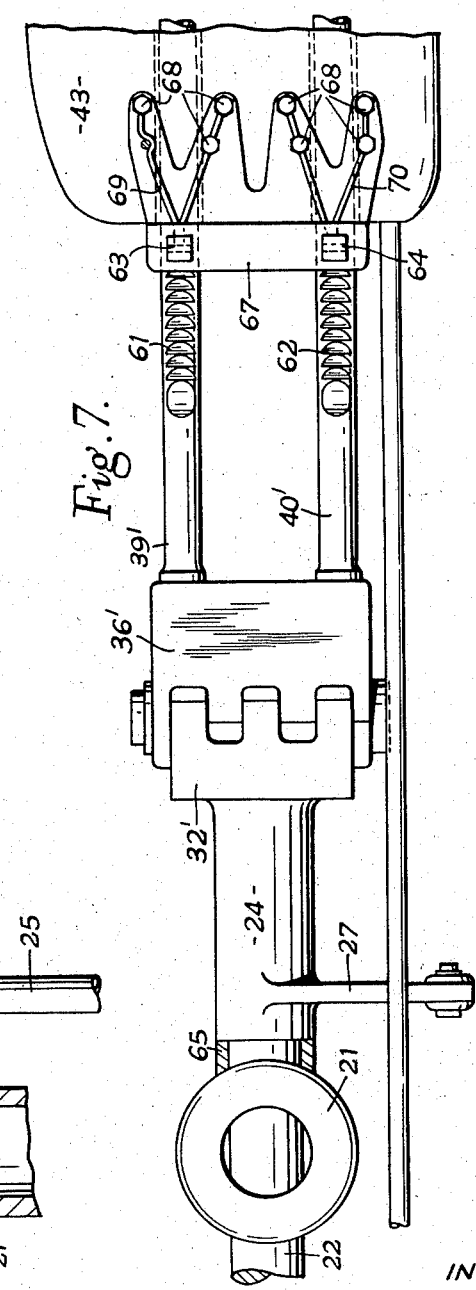
INVENTOR
HORST DIETER LUX
BY
Klein + Hart
ATTORNEY

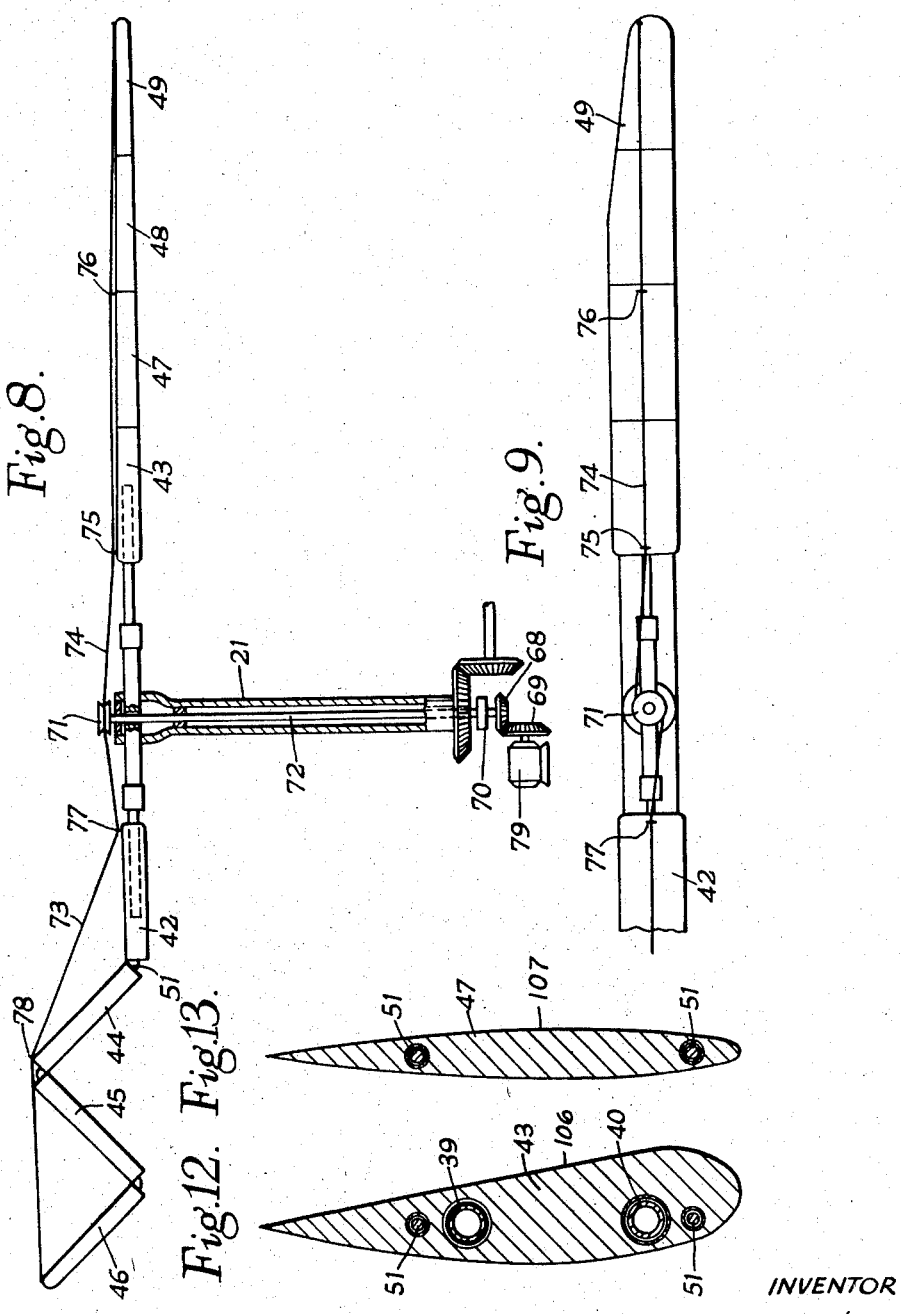

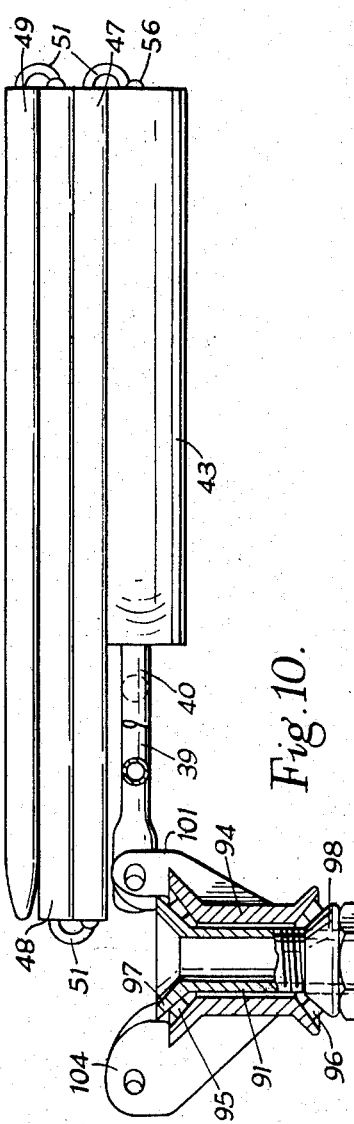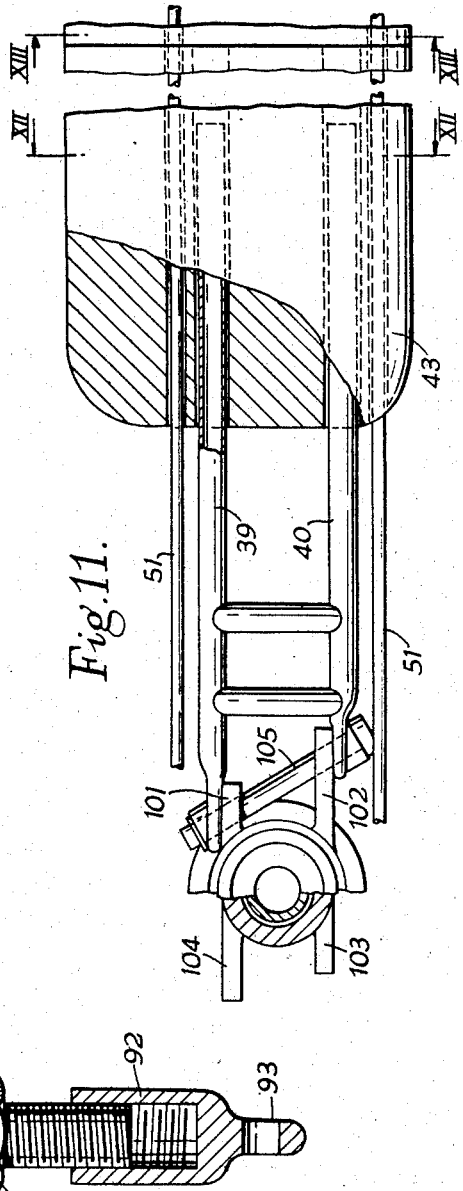

Jan. 20, 1959   H. D. LUX   2,869,649
HELICOPTER ROTOR
Filed April 7, 1953   6 Sheets-Sheet 6
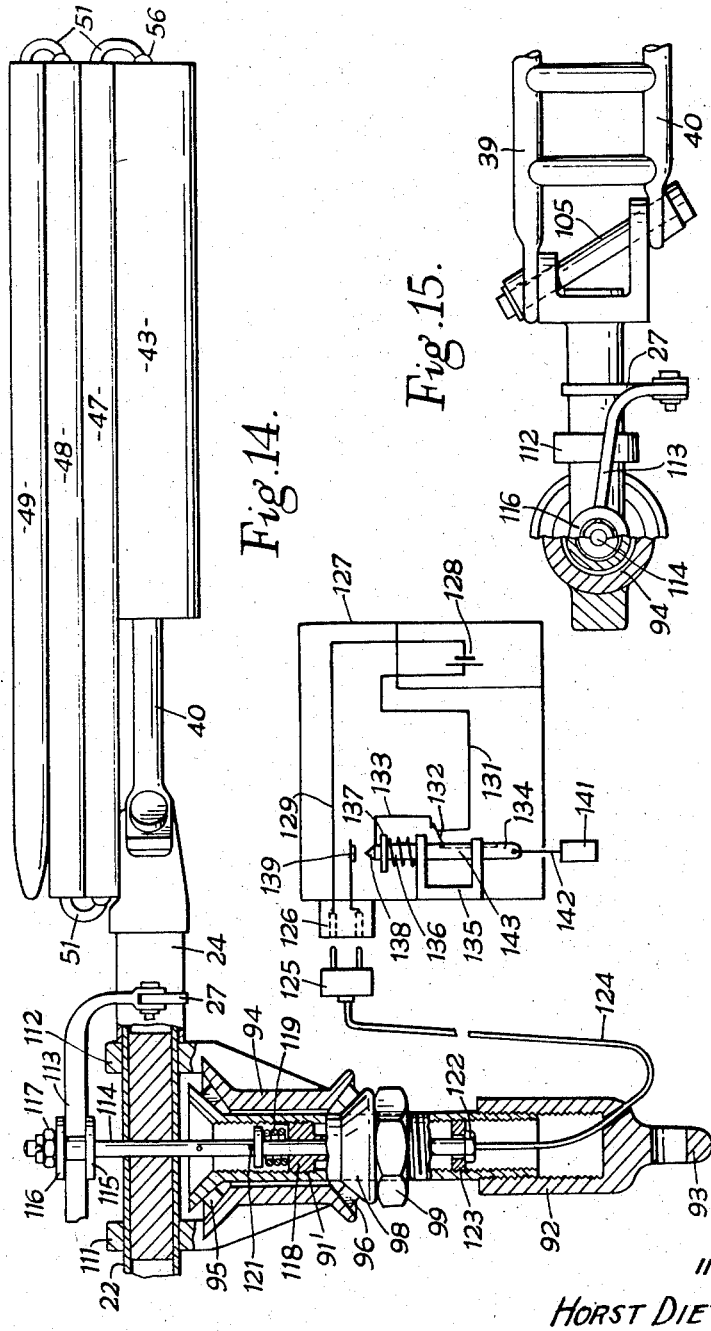
INVENTOR
HORST DIETER LUX
BY
Klein + Hart
ATTORNEY

United States Patent Office 2,869,649
Patented Jan. 20, 1959

2,869,649

HELICOPTER ROTOR

Horst Dieter Lux, Brighton, England, assignor to Murdo Mackenzie

Application April 7, 1953, Serial No. 347,235

15 Claims. (Cl. 170—160.11)

The present invention relates to rotors for helicopters and the like, including rotorchutes, and has for its main object to provide an improved rotor which is collapsible so as to occupy only a comparatively limited space when the helicopter is stored inside a hanger, aircraft carrier or the like, or when the rotorchute is stored in an aircraft, and is adapted, during the acceleration of the rotor in use from zero to its normal running speed, to be extended under the action of centrifugal force.

With this object in view, the improved rotor according to the present invention comprises at least one blade which is arranged so that the radially outer part thereof can be collapsed over the radially inner part thereof when not in use and which is adapted in use, when the rotor is accelerated from zero to its normal running speed, to be extended by the action of centrifugal force.

The invention is illustrated by way of example in the accompanying drawings in which:

Fig. 1 is a diagrammatic plan view illustrating a two bladed helicopter rotor with one blade folded, Fig. 2 is a partly sectioned elevation of the rotor, and Fig. 3 is a fragmentary perspective view illustrating a detail, Fig. 4 is a diagrammatic plan view illustrating a three-bladed rotor, Fig. 5 is a fragmentary perspective view of a helicopter provided with a rotor similar to that according to Figs. 1 to 3, but provided additionally with ratchet means for keeping the blades extended after the rotor has ceased to revolve, Fig. 6 is a partly sectioned elevation illustrating the ratchet means on an enlarged scale, and Fig. 7 is a corresponding plan view.

Fig. 8 is a partly sectioned elevation of a helicopter rotor with foldable blades, illustrating means for refolding the blades after use, and Fig. 9 is a corresponding plan view, partly broken away.

Fig. 10 is a partly sectioned elevation illustrating a rotor suitable for a rotorchute, Fig. 11 is a corresponding partly sectioned fragmentary plan view, and Figs. 12 and 13 are respectively cross-sections on lines XII—XII and XIII—XIII in Fig. 11.

Fig. 14 is a partly sectioned elevation corresponding to Fig. 10 illustrating a modification and Fig. 15 is a fragmentary plan view illustrating a detail of this modification.

The same references are used to indicate corresponding parts in the several figures of the drawings.

Figure 4:
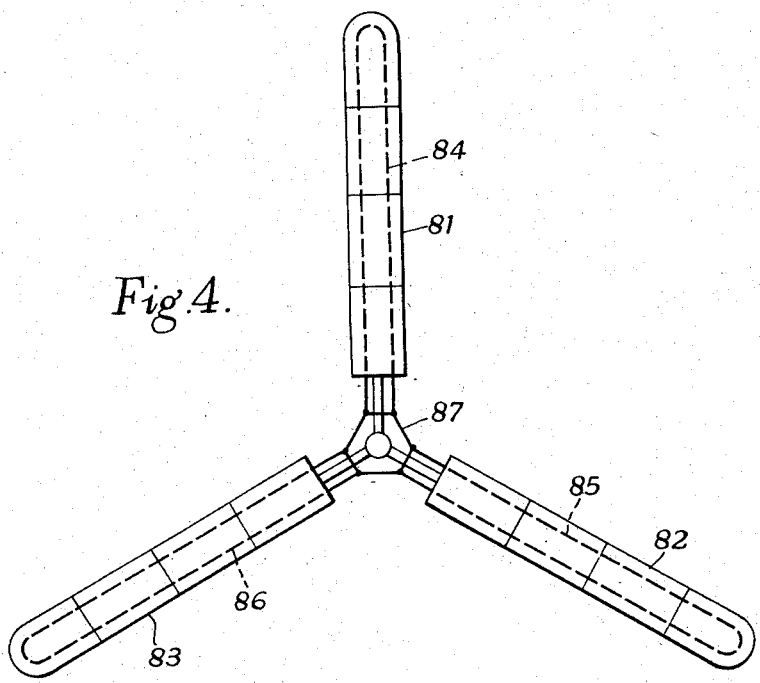

In Figs. 1 and 2, which illustrate the general arrangement of a helicopter rotor, the blade seen on the left is shown folded and the blade on the right extended, though in practice each blade will normally always be in the same condition as the other. The blades are drivably connected to a main driving shaft 21 to which are rigidly fixed two oppositely projecting short rods, one of which 22 can be seen in Fig. 2, which transmit the torque to the blades. Slidably mounted on the rods 22 are two tubular shafts 23, 24 which are rotatable on the rods 22 under the control of push rods, such as 25, pivotally connected at their upper ends to arms 26, 27 rigidly fixed to the said tubular shafts 23, 24. The push rods 25 may be actuated in known manner by a swash-plate (not shown). The outer ends of tubular shafts 23, 24 are pivotally connected by hinge pins 28, 29 to forked members 31, 32 which in turn are pivotally connected by hinge pins 33, 34, to yoke members 35, 36. Two parallel guide rods 37, 38 are fixed to yoke member 35 and two similar guide rods 39, 40 to yoke member 36. A root section 42 of one blade is slidably mounted on guide rods 37, 38 and a root section 43 of the other blade on guide rods 39, 40. All the other blade sections 44, 45, 46 and 47, 48, 49 are held together by an endless steel cable 51 which passes through guide holes in these blade sections. At the outer ends of the blade tip sections 46, 49, the steel cable 51 passes round arcuate guides such as 52 (Fig. 3). Blade tip covers, such as 53 are secured over the outer ends of the blade tip sections 46, 49 to give them an efficient aerodynamic shape. Hemispherical projections, such as 55, 56, on the outer ends of the blade sections 42, 44, 45, 43, 47 and 48 are adapted to engage in corresponding recesses in the inner ends of blade sections 44, 45, 46, 47, 48 and 49 respectively.

When the helicopter is stored in a hanger, both blades will normally be folded, as shown in Figs. 1 and 2 for blades 42, 44, 45, 46. When, however, the shaft 21 begins to rotate, the blades will be unfolded by the centrifugal force acting on them. As they unfold, the centrifugal force will also cause the blade sections 42, 44, 45 and 43, 47, 48 to slide outward over the cable 51, until they are closed tightly together and with the blade sections 45 and 48 in close contact with the blade tip sections 46 and 49 respectively. When in this extended condition, each blade will behave as a rigid unit, the above-mentioned hemispherical projections engaging in the corresponding recesses to prevent angular displacement of any one section with respect to the other sections of the same blade under the action of twisting forces. The total centrifugal force acting on each blade will then be supported by the cable 51.

Before the blades can be refolded, the blade root sections thereof must be slid inward along the guide rods 37, 38 and 39, 40 in the direction towards the shaft 21, and the intermediate blade sections 47, 48 (or 44, 45) must be similarly adjusted until there is sufficient slack in the portions of the cable 51 between the adjacent blade sections.

In this specification, the term "feathering hinge" will be used in referring to the pivotal connection between the tubular shafts 23, 24 and the short rods, such as 22, over which they fit, and the terms "drag hinge" and "flapping hinge" for the pivotal connections provided by hinge pins 28, 29 and 33, 34 respectively.

In many cases, it will be found that the drag hinge can be omitted altogether.

Fig. 4 shows how the arrangement illustrated in Figs. 1 to 3 can be adapted for use in a three-bladed rotor. Each of the three blades indicated generally by references 81, 82, 83 is composed of separable blade sections similar to those of the rotor shown in Figs. 1 and 2. In this case, however, the endless cable 51 of the previously described arrangement is replaced by a cable assembly consisting of three loops 84, 85, 86 threaded respectively through the sections of the three blades and connected by their inner ends to a ring 87 which may also be made of steel cable.

Figure 5:
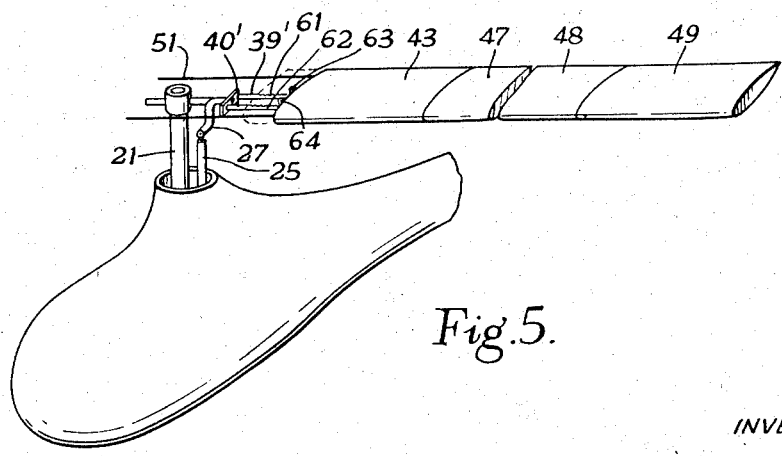

Fig. 5 diagrammatically illustrates a helicopter fitted with a rotor essentially similar to that shown in Figs. 1 to 3, but modified in that the guide rods 39', 40' are formed with ratchet teeth 61, 62 which cooperate with pawls 63, 64 as described later with reference to Figs. 6 and 7.

Referring to Figs 6 and 7, the arrangement of the driving shaft 21, rod 22 and tubular shaft 24 is similar to that of the corresponding parts shown in Figures 1 to 3. A distance bush 65 is, however, shown between shafts 21 and 24. On the yoke 36', there is furthermore formed a projection 66 which cooperates with a stop 67 on the part 32' to prevent the guide rods 39', 40' from swinging down below the horizontal when the rotor ceases revolving.

The pawls 63, 64 are mounted for vertical sliding movement in rectangular guideways in a support 67 (Fig. 7) secured to the inner end of the blade root section 43 by bolts 68. Springs 69, 70 anchored to the support 67 by the bolts 68 already referred to engage in recesses in the pawls 63, 64 and urge them downward into engagement with the ratchet teeth 61, 62.

Before the blade can be refolded, the pawls 63, 64 must, of course, be raised to disengage them from the ratchet teeth 61, 62.

Figs. 8 and 9 illustrate a blade-refolding mechanism which can be incorporated in the rotor illustrated in Figs. 1 to 3, without any very substantial modifications being required. This mechanism comprises a pulley 71 mounted on the upper end of a shaft 72 coaxially arranged within the hollow main driving shaft 21. Attached to the pulley 71 are two steel cables 73, 74, threaded through guides 75, 76, 77, 78 and connected respectively at their other ends to the tips of blade sections 46 and 49. The shaft 72 is drivably connected through bevel gears 68, 69 and a clutch 70 to an electric motor 79.

In operation, when the rotor ceases to revolve, the electric motor 79 will be switched on, and the clutch 70 engaged so that the pulley 71 rotates and winds up the steel cables 73, 74. In the meantime, the pawls 63, 64 (Figs. 5–7) of the ratchet gears, if such are provided, can have been disengaged by the effect of the initial pull on the steel cables 73, 74.

Alternatively the electric motor 79 bevel gears 69, 68 and clutch 70 may be replaced by a braking device (not shown) acting on the shaft 72. If this device is operated shortly before the rotor ceases revolving to bring the shaft 72 to rest, the steel cables 73, 74 will be wound up on the pulley 71 by the effect of the continued rotation of the rotor before the latter finally ceases to revolve, thereby causing the blades to fold.

To reduce aerodynamic disturbances to a minimum, the steel cables 73, 74 preferably are arranged to lie in grooves or the like in the top surface of the blade when the blades are extended.

The clutch 70 and electric motor 79, or the braking device which replaces them, may be arranged for operation in known manner by controls in the pilot's cockpit.

Figs. 10 and 11 illustrate a rotor for a rotorchute, which rotor is basically similar to the helicopter rotor described with reference to Figs. 1 to 3, in that the blade sections are foldable and are threaded over a steel cable 51. The blade root sections, such as 43, are also slidable over guide rods, such as 39, 40, and spherical projections, such as 56, are arranged in pairs to prevent relative angular displacement of the blade sections by twisting forces acting on the blades when they are extended.

A suspension tube 91, on the lower end of which is screwed a member 92 provided at its lower end with load-carrying eye 93, is rotatably mounted within a flanged sleeve 94 by means of upper and lower tapered roller bearings 95 and 96. For this purpose the tube 91 is provided with an inclined flange 97 at its upper end and has a bearing cone 98 screwed on its shank and locked in position thereon by a lock-nut 99. Fixed to the sleeve 94 are two pairs of lugs 101, 102 and 103, 104 which support inclined hinge pins such as 105 which provide the flapping hinges for the blades.

As shown in Figs. 12 and 13, the blade root section 43 has a different cross-section from the remaining blade sections 47, 48 and 49 which are similar in cross-section to one another. The relatively greater thickness of the blade root section 43 provides sufficient room to accommodate the guide rods 39, 40; and its shape is such as to accelerate initial rotation to the rotor before the blades unfold, the under surface 106 (Fig. 12) of the blade root section 43 having a greater negative incidence than the under surfaces such as 107 (Fig. 13) of the remaining sections 47, 48, 49 of the same blade.

Figs. 14 and 15 illustrate a modification of the arrangement illustrated in Figs. 10 to 13 in which means are provided for increasing the angle of incidence of the blades during the last part of a descent, shortly before landing, for the purpose of obtaining an additional braking effect.

In this modification, the flanged sleeve 94 is formed with two projecting lugs 111, 112 which support a short rod 22, the projecting ends of which support tubular shafts 24 forming the inner members of the flapping hinges. The tubular shaft 24 is prevented from sliding outwards off the rod 22 by an endless cable (not shown) arranged as illustrated in Figs. 1 and 11. Angular movements of the shaft 24 about the feathering axis, i. e. the axis of rod 22, are controlled by means of a lever arm 27 connected to a yoke member 113. The middle portion of the yoke member 113 is secured to the upper end of a rod 114 by being clamped between a flange 115 on said rod and a washer 116 by means of a castellated nut 117. The rod is mounted for rotation and axial sliding movement in a bush 118 screwed into the suspension tube 91'. A compression spring 119 fitted between the bush 118 and a washer 119 which bears against a cotter 121 urges the rod 114 upward, causing an explosive bolt head 122 on the lower end of rod 114 to bear against a limiting stop 123 screwed into the lower end of the suspension tube 91'.

The explosive bolt head 122 is connected by a flexible electric lead 124 to a plug 125 which is adapted to fit in a socket 126 attached to a box 127 containing a battery 128. One terminal of the battery 128 is connected by lead 129 to one terminal of the socket and its other terminal by a lead 131 to one contact of a switch 132 the other contact of which is connected by a lead 133 to a metal plunger 134 mounted on a bracket 135. A compression spring 136 arranged between the bracket 135 and a flange 137 on the plunger 134 tends to move the plunger upward to bring its pointed end 138 into engagement with an electrical contact 139 connected to the second terminal of socket 126. A weight 141 is attached by a cord 142 passing through a bore in the bottom of box 127 to the lower end of plunger 134. One end of the armature of switch 132 projects into a groove 143 in the side of the plunger 134.

In operation, after the rotorchute illustrated in Figs. 14 and 15 has been jettisoned from an aircraft with a load attached to the eye 93 and with plug 125 engaged in socket 126, the weight 141 drops down and by means of the cord 142 retracts the plunger against the pressure of the spring 136. The switch 132, which has previously been in the "off" position is now moved to the "on" position by the upper end of the slot 143 engaging the switch armature.

The circuit is now ready for operation. As soon as the weight 141 touches the ground, the plunger 134 will move upward until its pointed upper end 138 engages the contact 139, thereby connecting the electric primer of the explosive bolt head 122 in circuit with the battery 128. The bolt head 122 will now be blown off, whereupon the rod 114 will move upward, under the action of the spring 119, together with the yoke 113 which through its connection with the arm 27 rotates the shaft 24 so as to increase the angle of incidence of the blades.

The increase in the angle of incidence of the rotor blades produces an increased braking effect on the descent of the rotorchute and its load, so that the latter can be landed without any violent impact on the ground.

I claim:

1. A rotor for helicopters and the like, comprising a plurality of counterbalanced blades rotatable about a central axis, each of said blades being subdivided into a plurality of separate sections including a root section, a tip section and an intermediate section, means connecting said sections and constructed and arranged with relation to said sections to enable said sections of each blade to be moved from an aligned abutting condition into a longitudinally spaced relation and then rearranged in superimposed relation with said intermediate section located between said tip and root sections, and to enable said rearranged sections to move from said superimposed relation back into longitudinal alignment with the opposed ends of such sections in abutting engagement, said connecting means including rigid means supporting the root section of each blade for slidable movement radially of said central axis, and constructed and arranged relative to such root section to prevent angular displacement of the latter relative thereto, and including detachably engageable locking means on the opposed ends of adjacent sections of each blade and interengageable during the movement of such sections from said superimposed relation to said longitudinal alignment to prevent relative angular displacement of such aligned sections under twisting forces.

2. A rotor such as defined in claim 1, including means mounted for rotatable movement about an axis disposed radially of said central axis, hinged means supporting said rigid means on said rotatable means, and means connected to said rotatable means and operable to move the latter about its axis of rotation to change the angular positions of said rigid means and blade sections.

3. A rotor such as defined in claim 1 including means freely rotatable about said central axis, and means supporting said rigid means on said freely rotatable means so that said rigid means extends as a whole radially of said central axis.

4. A rotor as claimed in claim 3, wherein the rotor also comprises retaining means for normally maintaining the root sections of the blades at a given angle of incidence, resilient means urging the blades against said retaining means in a direction to increase their angle of incidence and means for releasing said retaining means.

5. A rotor as claimed in claim 4, wherein said retaining means includes an explosive bolt head having an electric primer and said releasing means includes an electric battery and a switch adapted to connect said battery in circuit with said electric primer.

6. A rotor as claimed in claim 5, wherein said electric switch is spring loaded towards the closed position and is operatively connected with a suspended weight, which while hanging free holds the contacts of said switch open, but when it strikes the ground, permits the springloaded switch to close the circuit of the electric primer.

7. A rotor for helicopters and the like, comprising a main shaft, at least one blade subdivided into a plurality of separate sections including a root section, a tip section and an intermediate section, means hingedly and slidably connecting said sections to enable said intermediate and tip sections to be moved into longitudinally spaced relation and to be folded inwardly towards said main shaft about axes normal to the central axis of the main shaft and to the center line of the root section so as to lie in superimposed relation, with the tip section over the intermediate section and the intermediate section over the root section, means drivingly connecting said root section to said main shaft, and means for folding said intermediate and tip sections into superimposed relation with said root section.

8. A rotor for helicopters and the like, comprising a main shaft, at least one blade subdivided into a plurality of separate sections including a root section, a tip section and an intermediate section, means hingedly connecting said sections to enable said intermediate and tip sections to be folded about axes normal to the length of said blade so that all of said sections are in superimposed relation with said intermediate section located between said root and tip sections, means drivingly connecting said root section to said main shaft, a cable guide provided on the inner end of said root section, a second cable guide provided on that end of said intermediate section which is to be initially raised during the folding of the blade, a cable extending through said cable guides and connected to the outer end of said tip section, and means connected to said cable located adjacent to said main shaft and operable to exert a tension on said cable, said guides and said cable coacting to cause said intermediate and tip sections to fold on said hinge means and against said root section when said last mentioned means is operated to exert a tension on said cable.

9. A rotor for helicopters and the like, comprising a main shaft and a blade drivably connected to said shaft, said blade being subdivided into a plurality of separate sections including a root section, a tip section and an intermediate section, means extending longitudinally of said blade and connecting the sections thereof together, said connecting means being constructed and arranged to enable said intermediate and tip sections to be folded so that all of said sections are in superimposed relation with said intermediate section located between said root and tip sections and to enable said intermediate and tip sections to be unfolded from such relation under the action of centrifugal force during rotation of the blade, said root and intermediate sections being slidable relative to said connecting means between an extended blade position in which there is end-to-end abutting engagement between all of said sections and a mutually spaced apart position in which said intermediate and tip sections can be folded against said root section.

10. A rotor for helicopters and the like, comprising a main shaft and a blade assembly drivably connected to said shaft, said blade assembly including at least two mutually counterbalanced foldable blades arranged for unfolding under action of centrifugal force during rotation of the blade assembly, said blade assembly including blade tip sections, a cable interconnecting said blade tip sections, and blade root and intermediate blade sections assembled end-to-end with the corresponding blade tip sections and slidably connected to said cable, said root and intermediate sections being slidable along said cable between an extended blade position in which there is end-to-end abutting engagement between them and the corresponding blade tip sections and a mutually spaced apart position in which the intermediate and blade tip sections can be folded relative the blade root sections so that the intermediate sections are located between the root and tip sections.

11. A rotor for helicopters and the like, comprising a main shaft and a blade assembly drivingly connected to said shaft, said blade assembly including at least two mutually counterbalanced foldable blades, each comprising a root section, a tip section and an intermediate section, cable means interconnecting all of said tip sections and hingedly connecting the sections of each blade together, said cable means being constructed and arranged with relation to all of said sections to enable the intermediate and tip sections of each blade to be folded relative the root section thereof to position the intermediate section between the root and tip sections and to enable the intermediate and tip sections of each blade to be unfolded under action of centrifugal force during rotation of the blade assembly, a plurality of cable guides provided on the sections of each blade, tension applying means located adjacent to said shaft, and a second cable means connected to said tension applying means and extending through the guides of each blade and connected to said tip sections of said blades, said cable guides and said second cable means being constructed and arranged to fold the intermediate and tip sections of each blade on the root section thereof when said tension applying means is operated to exert a tension on said cable means.

12. A rotor for helicopters and the like, comprising a main shaft, at least one blade subdivided into a plurality of separate sections including a root section, a tip section and an intermediate section, means hingedly connecting said sections to enable said intermediate and tip sections to be folded so that all of said sections are in superimposed relation with said intermediate section between said root and tip sections, means drivingly connecting said root section to said main shaft and including root section supporting means slidably connected to said root section and constructed to permit slidable movement of said root section thereon in a direction longitudinally of the blade and to prevent rotational movement of such root section thereon, and means connected to said main shaft and supporting said root section supporting means for rotational movement about an axis transverse to the axis of said shaft.

13. A rotor such as defined in claim 12, including detachably engageable locking means on said root section supporting means and said root section to permit outward sliding movement of said root section on such supporting means under the action of centrifugal force during the unfolding of said intermediate and tip sections and to prevent inward sliding movement of such root section after the blade has been extended.

14. A rotor such as defined in claim 13, in which said locking means includes ratchet teeth formed on said root section supporting means and a spring-loaded pawl carried by said root section.

15. A rotor such as defined in claim 12, in which said root section is thicker and has a more negative incidence than said intermediate and tip sections.

References Cited in the file of this patent
UNITED STATES PATENTS

| | | |
|---|---|---|
| 1,731,757 | Tubbe | Oct. 15, 1929 |
| 2,108,245 | Ash | Feb. 15, 1938 |
| 2,172,333 | Theodorsen et al. | Sept. 5, 1939 |
| 2,464,285 | Andrews | Mar. 15, 1949 |
| 2,614,636 | Prewitt | Oct. 21, 1952 |